(12) United States Patent  (10) Patent No.: US 8,282,202 B2
Irving et al.  (45) Date of Patent: Oct. 9, 2012

(54) AQUEOUS INKJET PRINTING FLUID COMPOSITIONS

(75) Inventors: Mark E. Irving, Rochester, NY (US); Steven Evans, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 132 days.

(21) Appl. No.: 12/915,527

(22) Filed: Oct. 29, 2010

(65) Prior Publication Data

US 2012/0105549 A1 May 3, 2012

(51) Int. Cl.
*B41J 2/17* (2006.01)

(52) U.S. Cl. ............... 347/95; 347/100; 347/56

(58) Field of Classification Search .......... 347/20, 347/56, 95, 100; 106/31.6, 31.13, 31.27; 523/160–161
See application file for complete search history.

(56) References Cited

U.S. PATENT DOCUMENTS

| | | | |
|---|---|---|---|
| 3,761,953 A | 9/1973 | Helgeson et al. | |
| 4,734,711 A | 3/1988 | Piatt et al. | |
| 5,394,177 A | 2/1995 | McCann et al. | |
| 6,435,659 B1 | 8/2002 | Bruinsma et al. | |
| 6,588,888 B2 | 7/2003 | Jeanmaire et al. | |
| 6,607,268 B2 | 8/2003 | Bruinsma et al. | |
| 6,646,024 B2 * | 11/2003 | Beach et al. | 523/160 |
| 6,730,149 B2 | 5/2004 | Arita et al. | |
| 6,943,037 B2 | 9/2005 | Anagnostopoulos et al. | |
| 7,370,952 B2 | 5/2008 | Inoue et al. | |
| 2008/0129811 A1 | 6/2008 | Tanaka et al. | |
| 2012/0105535 A1 | 5/2012 | Sowinski et al. | |
| 2012/0105548 A1 | 5/2012 | Irving et al. | |
| 2012/0105550 A1 | 5/2012 | Irving et al. | |
| 2012/0105553 A1 | 5/2012 | Sowinski et al. | |

FOREIGN PATENT DOCUMENTS

EP  1 013 450  7/2006
WO  2009/035944  3/2009

OTHER PUBLICATIONS

Kendall, D.L.; Shoultz, R.A., "Wet Chemical Etching of Silicon and SiO2, and Ten Challenges for Micromachiners," SPIE Handbook of Microfabrication, Micromachining, and Microlithography, vol. 2, SPIE Optical Press, pp. 41-97. Ed. P. Rai-Choudhury, Bellingham, Washington, Oct. 1997.

* cited by examiner

*Primary Examiner* — Juanita D Jackson
(74) *Attorney, Agent, or Firm* — Andrew J. Anderson

(57) ABSTRACT

An aqueous inkjet printing fluid composition for use in an inkjet printer comprising a silicon-based material which contacts the aqueous printing fluid composition, comprising in a concentration sufficient to inhibit corrosion of the silicon-based material when contacted by the aqueous printing fluid composition a soluble metal ligand complex of Formula (I):

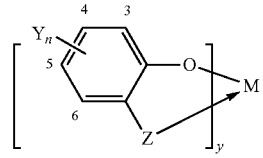

wherein M represents a divalent or a trivalent metal; Z represents OH or $CO_2H$; n represents an integer from 1-4; each Y may independently be chosen from the group consisting of halogen, cyano, carboalkoxy, alkyl, alkoxy, aryl, hetaryl, carboxy, hydroxy, sulfo and phospho, or any two of Y on adjacent carbons may be combined together to form a 5-7 atom carbo- or heterocyclic ring; and the number of ligands y is 2 or 3; with the proviso that at least one Y comprises a solubilizing group capable of imparting water solubility to the complex. The useful lifetime of microelectromechanical fluidic devices based on silicon fabrication is extended.

20 Claims, No Drawings

AQUEOUS INKJET PRINTING FLUID COMPOSITIONS

CROSS-REFERENCE TO RELATED APPLICATIONS

Reference is made to commonly assigned U.S. Publication Numbers 2012/0105550, 2012/0105548, 2012/0105553, and 2012/0105535, each filed Oct. 29, 2010 and directed towards "Aqueous Inkjet Printing Fluid Compositions," the disclosures of which are incorporated by reference herein in their entireties.

FIELD OF THE INVENTION

The present invention is related to aqueous compositions useful in inkjet printers, and a process for printing aqueous inkjet printing fluid compositions. In particular, the invention is directed towards such process wherein an aqueous inkjet printing fluid employed comprises a soluble metal ligand complex that reduces the corrosion of silicon-based material comprising useful microelectromechanical devices in contact with the printing fluid. The printing fluid compositions employed, including colored inks, clear inks, and other aqueous inkjet printing fluid compositions, are particularly useful for extending printing device lifetimes in drop-on-demand and continuous inkjet printing applications.

BACKGROUND OF THE INVENTION

Silicon-based materials, where silicon is the primary material of construction, are employed in numerous integrated circuits (IC) and microelectromechanical systems (MEMS) devices. However, it has long been known that in aqueous chemical environments, where silicon-based sensors and actuators may be used, that corrosion (etching) of the silicon-based materials can cause premature device wear and failure. In fact, there are many commonly used processes for machining silicon that rely on wet corrosion (etching) of silicon and silicon-based materials such as silicon oxides and silicon nitrides; see for example Kendall, D. L.; Shoultz, R. A. "Wet Chemical Etching of Silicon and $SiO_2$, and Ten Challenges for Micromachiners", *SPIE Handbook of Microfabrication, Micromachining, and Microlithography*, Vol. 2, SPIE Optical Press, pp. 41-97, 1997. Ed. P. Rai-Choudhury. Recently, MEMS technology has been applied to fluid management systems employed in inkjet printing systems.

Inkjet printing is a non-impact method for producing printed images by the deposition of ink droplets in a pixel-by-pixel manner to an image-recording element in response to digital signals. There are various methods that may be utilized to control the deposition of ink droplets on the image-recording element to yield the desired printed image. In one process, known as drop-on-demand (DOD) inkjet, individual droplets are projected as needed onto the image-recording element to form the desired printed image. Common methods of controlling the ejection of ink droplets in drop-on-demand printing include thermal bubble formation (thermal inkjet (TIJ) and piezoelectric transducers. In another process known as continuous inkjet (CIJ), a continuous stream of droplets is generated and selected droplets are separated and expelled in an image-wise manner onto the surface of the image-recording element, while non-imaged droplets are deflected, caught and recycled to an ink sump. Inkjet printers have found broad applications across markets ranging from desktop document and photographic-quality imaging, to short run printing and industrial labeling.

Most types of inkjet printers employ a printing head made from silicon-based materials including silicon, silicon dioxide, and silicon nitride because these materials are common in semiconductor fabrication facilities and can be readily processed to form highly complex integrated circuits and electromechanical devices. Parts of the print head including the printing nozzles as well as the channels that feed ink to the print head and printing nozzles often contain regions of these silicon-based materials that are in direct contact with the printing ink. It is well known in the art that a wide range of ink compositions can cause these silicon-based materials to dissolve or induce stress that results in mechanical failure and increased rates of dissolution (U.S. Pat. No. 6,730,149 B2). The reliability of the inkjet printing device can be dramatically reduced by these interactions between the ink and the silicon-based materials in the print head.

Continuous inkjet (CIJ) printers typically consist of two main components; a fluid system and a print head, or multiple print heads. Printing fluid such as ink is pumped through a supply line from a supply reservoir to a manifold that distributes the ink to a plurality of orifices, typically arranged in linear array(s), under sufficient pressure to cause ink streams to issue from the orifices of the print head. Stimulations are applied to the print head to cause those ink streams to form streams of spaced droplets, which are deflected into printing or non-printing paths. The non-printing droplets are returned to the supply reservoir via a droplet catcher and a return line. U.S. Pat. Nos. 3,761,953 A, 4,734,711 and 5,394,177 and EP 1,013,450 describe in detail the design of a fluid system for CIJ apparatus. The more recent development of a silicon-based MEMS CIJ printhead fabrication and printing apparatus can be found in U.S. Pat. No. 6,588,888 and U.S. Pat. No. 6,943,037, the disclosures of which are herein incorporated by reference. The design of the nozzle plate (printhead die) used in the drop generator of the printing system is one of the distinguishing elements of MEMS CIJ technology. A single crystal silicon die may be used as the substrate for the nozzle plate and, complementary metal oxide semiconductor (CMOS) electronics are included as part of the device. The surface nozzle structures and associated on-board CMOS electronics are fabricated using the same manufacturing technologies and material sets employed for the construction of silicon integrated circuits. The printhead die also incorporates fluid channels running through the silicon. During drop generation, heaters in the device transfer thermal energy to the fluid jetting through each nozzle.

As noted in the discussion above, the CIJ printhead is comprised of several components. A more detailed discussion of the printhead and its operation is provided herein with particular emphasis on silicon and its interactions with fluids, given that silicon-fluid interactions are particularly relevant to the present invention. These components include a manifold for interfacing with the fluid system and accepting ink or other fluids supplied by the fluid system to allow transport of these fluids to other components of the printhead; an electrical interconnect system means for interfacing with the electrical signals supplied by an external writing system that supplies the printhead with the information pertaining to the drop-wise formation of a printed image on a support, where the support is stationary or non-stationary, from ink-containing drops generated by the printhead; and a drop-generating component, whose function is to provide a means for generating drops from ink or other fluids delivered to the drop generating component from the manifold. The drop-generating component providing a means for generating drops in a silicon-based CIJ printing system employs silicon-based devices fabricated using the same technology employed for fabricating silicon integrated circuits. The silicon-based devices may contain multiple fluid channels as well as a plurality of small orifices, also called nozzles, which enable ink or other fluids supplied by the fluid system to pass from the manifold to the support through the formation of one or more columns of fluid also called fluid jets, which exit the silicon-based device when appropriate pressures are employed. The fluid column(s) or fluid jet(s) transform into well-defined drops under appropriate conditions. The pressures employed in silicon-based CIJ printing system are generally above 69 kPa and less than 1380 kPa. The materials of construction of the silicon-based devices in a silicon-based MEMS CIJ printhead may be quite varied and the materials of construction that contact ink or other fluids supplied by the fluid system or manifold are of particular interest to the present invention.

Silicon-based devices used as components that provide a means for generating drops from a fluid are generally fabricated using substrates prepared from single crystal silicon. The use of large grain polycrystalline silicon substrates for device fabrication is known in the art. The substrates may have varying thicknesses, from 50 microns to greater than 1 mm, and the substrate surface may have any crystallographic orientation that is suitable for the device application. For example, the silicon substrate may be prepared with an orientation defined by Miller indices of <100>, <111>, <110>. The use of various crystallographic orientations in device substrates is well known to those familiar with the art of semiconductor device fabrication. The crystal orientation of single crystal silicon is commonly indicated thusly; Si(100), Si(111), or Si(110) for example. The single crystal silicon substrate may have varying electrical properties. For example, the electrical properties of the single crystal silicon can be varied by the incorporation of small amounts of foreign impurities, also called dopants or carriers. These foreign impurities, such as, for example, boron or phosphorus, determine whether the electrical charge of the majority carrier type in the silicon crystal is negative or positive. Such modified substrates are known as n-type and p-type silicon, respectively. The use of both p and n-type silicon substrates for fabrication of silicon-based devices is known in the art. The use of silicon substrates of low resistivity, where the resistivity is less than 100 ohm-cm, and the use of silicon substrate of high resistivity where the resistivity is greater than 1000 ohm-cm, irrespective of carrier type and substrate crystallographic orientation, is known in the art of semiconductor device fabrication.

The additional preparation of substrates by deposition of layers of silicon, either polycrystalline or amorphous by various means as well as deposition of silicon by various means on insulating layers prepared by various means, such as, for example, polysilicon deposited on silicon dioxide insulators formed by thermal oxidation of the silicon substrate, also known as silicon on insulator or SOI, is known in the art. The resulting deposited silicon containing layer(s) may be either doped or undoped, p-type or n-type, and additionally may be either polycrystalline, meaning that the arrangement of silicon atoms in three dimensional space within the layer are identical with those found in single crystal silicon, or amorphous or poorly crystalline, meaning that that the arrangement of silicon atoms in three dimensional space within the layer deviates relative to those found in single crystal silicon and shows varying degrees of disorder relative to those atomic positions found in single crystal silicon. Device performance has been shown to improve after substrate surface quality has been controlled by the use of additional layer deposition, and this observation is familiar to those knowledgeable in the art of semiconductor device fabrication.

The use of subsequently deposited layers optionally containing silicon is known in the art of semiconductor device fabrication. Deposited layers optionally containing silicon can be prepared by any method known in the art of semiconductor device fabrication including chemical vapor deposition with the optional use of plasma assistance or enhancement at low (<400° C.) and high temperatures (>400° C.) under both low pressure (<1 torr) and high pressure (>1 torr) conditions. Deposited layers optionally containing silicon can be prepared by vapor deposition by physical vapor deposition (evaporation) optionally plasma assisted or enhanced, as well as by epitaxial growth methods. The resulting optionally silicon containing layers may be electrically insulating or electrically conductive to varying degrees, either doped or undoped, p-type or n-type, and additionally may be either polycrystalline, meaning that the arrangement of atoms in three dimensional space within the layer are identical with those found in single crystals of the same elemental composition, or amorphous or poorly crystalline, meaning that that the arrangement of atoms in three dimensional space within the layer deviates relative to those found in single crystal of the same composition and shows varying degrees of disorder relative to those atomic positions found in single crystal silicon. It is known in the art that silicon containing deposited layers may contain additional foreign atoms of varying amounts including, for example, some of the aforementioned dopants boron and phosphorus to control electrical properties, and additional atoms, interstitial or otherwise, resulting from the deposition process or a combination thereof. Examples of dopants include boron, phosphorus, arsenic, nitrogen, carbon, germanium, aluminum, and gallium. Examples of interstitial or non-interstitial foreign atoms include hydrogen, oxygen, nitrogen, carbon, select atoms from elements listed from group VI B of the periodic table (O, S, Se, Te) and select atoms of elements listed in the group VII B of the periodic table (F, Cl, Br, I). Hydrogen, oxygen, nitrogen, and carbon are commonly present with silicon in devices and devices containing microelectromechanical systems and each of the elements oxygen, nitrogen and carbon are often found combined with silicon in the form of stoichiometric or non-stoichiometric binary, ternary, and quaternary compounds like silicon hydrides of varying compositions, silicon oxides of varying compositions and hydration including silicon suboxides and hydrated silicon oxides and suboxides, silicon nitrides of varying compositions, silicon oxynitrides of varying compositions, silicon carbides of varying compositions, and silicon oxycarbides of varying compositions. In addition, a variety of glass compositions are commonly employed in micro fabrication, and they have different mechanical and chemical properties. Undoped silicate glass layers (USG) can be made from several starting materials and processes. Spin-on-glasses (SOG) from tetraethylorthosilicate (TEOS) decomposition, which provide excellent uniformity and step coverage, are attractive in microprocessing. Doping with phosphine produces a phosphosilicate glass (PSG), and additionally including boron produces a borophosphosilicate glass (BPSG). Doping increases the wet and dry process etching rates, and the softening temperatures for processing flexibility during device fabrication. These binary and ternary silicon containing compounds can be either discrete layers in the device or part of the surface composition of silicon, polysilicon, and amorphous silicon. Additionally, other elements such as Al, Ti, Ta, W, Zr, Hf, and Cu are often found with silicon and/or silicon containing binary compounds such as silicon oxides and silicon carbides, in devices and are sometimes observed as intermetallic alloys with silicon. Examples of intermetallic silicon containing alloys are titanium containing silicides of all compositions, tantalum containing silicides of all compositions, tungsten containing silicides of all compositions, zirconium containing silicides of all compositions, hafnium containing silicides of all compositions, copper containing silicides of all compositions, as well as ternary aluminum silicon oxides, ternary hafnium silicon oxides, ternary zirconium silicon oxides. Those knowledgeable in the art of semiconductor device fabrication are familiar with the different alloys, binary compounds, ternary and quaternary compounds that can form during processing and this is considered common knowledge in the art.

When a continuous inkjet printing system is in operation, fluid is essentially always flowing through the nozzles of the drop generator. There may be startup fluids passing through the printer for cleaning the fluid delivery system before printing with inks. Inks may remain in the printing system for extended times during a given printing run because the run duration may vary from hours to weeks. Flushing fluids may be used during ink changeovers or as part of routine maintenance. When the system is printing, only a small portion of the ink passing through the drop generator actually prints on the substrate. Most of the ink is collected and returned to the fluid delivery system for reuse. Finally, shut down fluids and storage fluids may be used to clean out inks from the fluid delivery system and the printhead, and ensure that the system does not fail during startup after storage.

It is desirable to have a print head operate reliably for many hundreds to thousands of hours. The fluid volume passing through a CIJ print head is large; accordingly, over a desired print head lifetime, many thousands of liters of solution can pass through the print head die. Therefore there is extensive exposure of the silicon-based nozzleplate to fluids in CIJ systems. Any degradation of the silicon-based materials in these solutions, as by corrosion (or etching, or dissolution), represents a great concern.

While typically not exposed to the same volume of fluid as are CIJ print heads, drop-on-demand inkjet printing systems employing printing heads made from silicon-based materials can similarly be impacted by undesired degradation of the silicon-based materials upon exposure to aqueous inkjet printing fluids. This problem has been difficult to solve. In some inkjet printing systems, the silicon-containing portions of the print head, in particular the ink chamber, the nozzles, and the ink channels are replaced along with the ink cartridge so that the lifetime of the silicon-based materials is limited to the lifetime of the individual ink cartridge. This approach dramatically increases the cost of the ink cartridge, and limits the printing system design.

Another approach to preventing aqueous printing fluids from dissolving the silicon-based materials has been to coat or deposit a resistant material on all the surfaces that come in contact with the printing fluid. These coatings can be either organic such as polymers or inorganic such as oxides of titanium or hafnium. This method also has the drawback of increasing the cost of the print head and often is also plagued by poor uniformity or pinholes in the coating that limit the protection from the printing fluid.

There is a strong need for ink compositions that do not dissolve or damage the silicon-based materials in the print head.

Ink compositions containing colorants used in inkjet printers can be classified as either pigment-based, in which the colorant exists as pigment particles suspended in the ink composition, or as dye-based, in which the colorant exists as a fully solvated dye species that consists of one or more dye molecules. Pigments are highly desirable since they are far more resistant to fading than dyes. However, pigment-based inks have a number of drawbacks. Great lengths must be undertaken to reduce a pigment to a sufficiently small particle size and to provide sufficient colloidal stability to the particles. Pigment-based inks often require a lengthy milling operation to produce particles in the sub-micron range needed for most modern ink applications. If the pigment particles are too large light scattering can have a detrimental effect on optical density and gloss in the printed image.

A second drawback of pigmented inks is their durability after printing, especially under conditions where abrasive forces have been applied to the printed image. Furthermore, the images printed onto an inkjet receiver are susceptible to defects at short time intervals, from immediately after printing to several minutes while the inks are drying. Finally, the durability of the dried image is also subject to environmental factors such as temperature and humidity which, under certain circumstances, can degrade image durability. To this extent, pigmented inks have been formulated with various polymers, dispersants and other addenda in attempts to provide durable images that can withstand post printing physical abuse and environmental conditions.

A number of approaches to reducing the propensity of the ink to dissolve or damage the silicon-based print head materials have been disclosed. Dissolution of silicon-based, drop-on-demand thermal inkjet (TIJ) printhead components, especially components comprised of silicon oxides or silicates to form soluble silicates has been reported to be inhibited by the addition of suitable trivalent metal ions such as Al (III) or Fe (III) as disclosed in WO 2009/035944A3 to Yue at al, the disclosure of which is herein incorporated by reference. Because the metal salts can inhibit dissolution of silicon oxides, they can also be effective in the inhibition of silicon metal etching by preventing dissolution of the native silicon oxide present on silicon metal. Disclosed metal salts include aluminum nitrate nonahydrate and ferric nitrate, added in amounts to provide about 10-50 ppm of metal ion. U.S. Pat. Nos. 6,435,659 and 6,607,268 B2 to Bruinsma and Lassar similarly disclose use of aluminum salts added to drop-on-demand thermal inkjet ink to form a passivating protective layer on the resistive heater of the printhead. While addition of aluminum organic chelate complexes and aluminum metal are noted as alternative sources to aluminum salts for the aluminum added to the ink, all examples employ aluminum nitrate, and certain examples actually disclose that organic acids added as buffers can act to chelate the aluminum ions and prevent formation of the desired passivating film. In a similar vein, Arita et al. in U.S. Pat. No. 6,730,149 B2 disclose the stabilization of silicon-based piezoelectric print head devices against the debilitating effects of device corrosion by the inclusion of metal cations such as zinc (II) and aluminum (III).

There are, however, unsatisfactory effects associated with the inclusion of multivalent salts in inkjet inks, especially the preferred aluminum ion. Widely used, soluble azo dye colorants (e.g., Direct Black 19, Direct Red 28, Direct Blue 86, etc.) can react with solvated aluminum ion at normal, alkaline ink pH levels, and produce insoluble matter—solvated aluminum ion has been investigated as a wastewater purification coagulant treatment to remove such dyes specifically, as supplementing its widespread use for general soluble organic material. Pigmented inks frequently contain organic polymer binders or dispersants as noted above, which are typically solubilized at weakly alkaline pH levels by deprotonation of carboxylic acid groups. The resultant carboxylate ions form complexes with multivalent metal ions, and the polymers may further crosslink and become insoluble. Paper substrates for inkjet printing are often treated with calcium ion or other multivalent salts, for example, to precipitate the colorants and binders at the paper surface, resulting in increased reflection optical density. Furthermore, a very complicated, pH-dependent chemistry results from the simple dissolution of an inorganic aluminum salt in water. A pH-neutralized aluminum ion solution initially may contain mononuclear aqua complexes or multinuclear polyoxocation cluster, but these species are all unstable to eventual polymerization and formation of sols, or dispersed colloidal aluminum hydroxide or hydroxyoxide material that will eventually precipitate. Thus dilute aluminum reagent solutions are needed to avoid severe reactions with typical inkjet ink components during ink mixing. The useful lifetime of the aluminum reagent solution used to make an inkjet ink is reduced, and the inkjet ink quality and shelf-life is also affected. The formation of any precipitates causes numerous problems: the multivalent metal passivating agent is removed from the ink fluid enabling the resumption of printhead corrosion; precipitates can lead to filter pore blocking or jetting orifice blocking; deposit build up on printhead components such as the nozzle plate can produce jets that are misaligned and result in printing errors; contamination of TIJ heater surfaces can cause misfiring or complete drop ejection failure.

Another approach employs dispersions of specific metal oxide particles such as alumina or cerium oxide where the particles have a positive charge in the pH range from 4 to 6 (US2008/0129811 A1) as characterized by their positive zeta potential in this pH range. These positively charged particles are believed to adhere to the negatively charge silicon-based surfaces in the print head and thereby eliminate the dissolution of these surfaces by the ink. These methods are limited to specific ink compositions and may not work well with pigment-based inks where a negative charge on the pigment surface and polymers is critical to the stability of the pigment dispersion and resulting ink. Another general approach to improving ink performance with regard to silicon corrosion is through adjustment of the ink pH value through the use of appropriate buffer solutions. For example, Inoue et al. in U.S. Pat. No. 7,370,952 B2 note that buffers can be used to adjust the pH values of inks used in drop-on-demand inkjet printers to reduce the effects of corrosion. This is primarily because the corrosion of silicon is known to be accelerated by higher pH value (more alkaline) solutions, such as those used in wet etching processes. At the same time, compositions useful to inkjet inks often require some alkalinity in order to maintain solution integrity, e.g., in order to prevent precipitation of ink components.

An improvement in silicon, silicon oxide and glass passivation reagents for inkjet printing fluids is needed.

SUMMARY OF THE INVENTION

The need for increased microelectromechanical silicon printhead durability when jetting aqueous fluids is provided by an aqueous inkjet printing fluid composition for use in an inkjet printer comprising a silicon-based material which contacts the aqueous printing fluid composition, comprising in a concentration sufficient to inhibit corrosion of the silicon-based material when contacted by the aqueous printing fluid composition a soluble metal ligand complex of Formula (I):

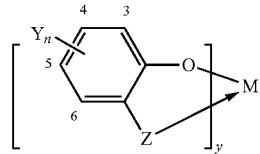

wherein M represents a divalent or a trivalent metal; Z represents OH or $CO_2H$; n represents an integer from 1-4; each Y may independently be chosen from the group consisting of halogen, cyano, carboalkoxy, alkyl, alkoxy, aryl, hetaryl, carboxy, hydroxy, sulfo and phospho, or any two of Y on adjacent carbons may be combined together to form a 5-7 atom carbo- or heterocyclic ring; and the number of ligands y is 2 or 3; with the proviso that at least one Y comprises a solubilizing group capable of imparting water solubility to the complex.

ADVANTAGEOUS EFFECT OF THE INVENTION

The invention provides numerous advantages. It has been found most unexpectedly that formulation of aqueous inkjet printing fluid compositions with metal ligand complexes of the invention provide large improvements in the stability of inkjet printing fluid compositions while simultaneously minimizing the etching of silicon-based materials, especially silicon-based glasses in contact with the inkjet printing fluid. The invention provides a process for printing inkjet ink compositions through silicon-based printheads, and for printing with other improved aqueous fluids that inhibit etching of the silicon-based device components in water. The robust performance and useful lifetime of silicon-based microelectromechanical fluidic devices is extended.

DETAILED DESCRIPTION OF THE INVENTION

The inkjet printing fluids of the present invention are aqueous-based printing fluids. By aqueous-based it is meant that the printing fluid comprises mainly water as the carrier medium for the remaining printing fluid components. In a preferred embodiment, the printing fluids of the present invention comprise at least about 50-weight percent water. Pigment-based inks are defined as inks containing at least a dispersion of water-insoluble pigment particles. Dye-based inks are defined as inks containing at least a colored dye, which is soluble in the aqueous carrier. Colorless inks are defined as inks, which are substantially free of colorants such as dyes or pigments and as such, are not intended to contribute to color formation in the image forming process. In a particular embodiment, the present invention is particularly useful in inkjet printing fluids which comprise at least one of an anionically charged or dispersed colorant and an anionic charged polymer, which colorants or polymer are susceptible to undesirable interaction with multivalent metal ions in solution.

Synthesis of the metal ligand complexes useful in the invention may be accomplished by separately preparing the organic ligand, if not available commercially, and then forming the coordination complex by carrying out a ligand displacement reaction on a suitable metal salt in alkaline aqueous solvent. Ligand displacement reactions typically proceed under alkaline conditions in water using an inorganic salt that dissociates readily to provide an aquo or hydroxo complex. The organic ligand employed in the present invention comprises at least one solubilizing substituent group capable of imparting useful water solubility to the ligand and the resulting complex. Upon heating, the metal ion's waters of hydration are displaced by the ligand anion, forming a water soluble complex. A representative process is described by equations Rxn-1 through Rxn-3.

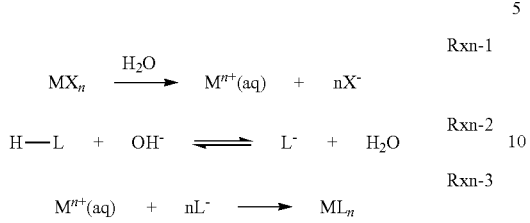

Metal ions M useful in coordination compounds of the invention include Al (III), Ga (III), In (III), Cr (III), Fe (III), and Zn (II). Aluminum (III) and Fe (III) are preferred metals. Aluminum (III) is most preferred.

Ligand selection is critical to providing a metal coordination complex for use according to the invention. The ligand must provide for a stable organic chelate coordination complex that does not dissociate appreciably in the printing fluid composition. Expressed another way, Rxn-3 does not proceed appreciably in the reverse direction. Otherwise, metal-aquo complexes will form from the hydrolysis of the organic ligand coordination complex, which can increase the acidity of the inkjet printing fluid and also render the metal ion available for reaction with inkjet fluid constituents, such polymers with ionized carboxylate substituents, thus potentially creating highly undesirable insoluble matter. Furthermore, when a water molecule enters the metal coordination sphere, the aquo complex may begin a reaction pathway to form insoluble metal oxides, and such oxides may foul the printhead, block nozzles, or reduce the effectiveness of the etching inhibition. The ligand must provide for a metal coordination complex that is soluble in the aqueous printing fluid. If the ligand is too hydrophobic, adequate concentrations of the complex will not be available in the inkjet ink composition to inhibit silicon oxide and glass dissolution. For the purposes of this invention, soluble metal ligand complexes are defined as complexes having a solubility in the aqueous printing fluid of at least about 0.01 weight percent at 25° C.

In Formula I, Z represents either OH or $CO_2H$, and each Y may independently be chosen from the group consisting of halogen, cyano, carboalkoxy, alkyl (preferably of 1 to 6 carbons), alkoxy, aryl, hetaryl, carboxy, hydroxy, sulfo and phospho, or any two of Y on adjacent carbons may be combined together to form a 5-7 carbo- or heterocyclic ring. Such substituents themselves may be further substituted or unsubstituted. At least one Y specifically comprises a solubilizing group capable of imparting water solubility to the complex. In the absence of such a solubilizing group, corresponding complexes otherwise of Formula I are not effectively water soluble. Representative Y substituents may comprise, e.g., a carboxy ($CO_2H$), sulfo ($SO_3H$) or phospho ($PO_3H$) solubilizing group. In specific embodiments, at least one Y substituent is a sulfo group, and in a particular preferred embodiment is a 4-sulfo or 5-sulfo group substituent.

Specific embodiments of soluble metal ligand complexes of the type useful in the invention include the following compounds of Formula IA:

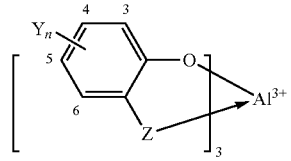

| | Z | Y |
|---|---|---|
| I-1 | OH | 4-$SO_3H$ |
| I-2 | $CO_2H$ | 5-$SO_3H$ |
| I-3 | OH | 3,5-$(SO_3H)_2$ |
| I-4 | OH | 3-OH-6-$SO_3H$ |
| I-5 | OH | 5-PO3H2 |
| I-6 | OH | 3-OH-5-$CO_2H$-6-$SO_3H$ |
| I-7 | $CO_2H$ | 4-$CO_2H$-5-OH |
| I-8 | $CO_2H$ | 4-$CO_2H$ |
| I-9 | $CO_2H$ | 3-MeO-4-$CO_2H$ |

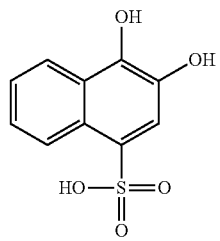

I-10

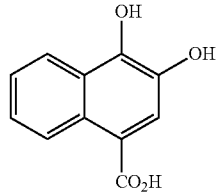

I-11

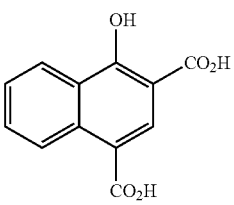

I-12

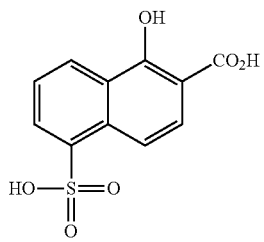

I-13

The metal coordination complex is desirably comprised of a single type of ligand of a single identity and structure, but the use of mixtures of ligand types or ligand isomers to form a mixture of metal coordination complexes is specifically contemplated. The objects of the invention can be accomplished with a single metal complex according to the invention, or individual preformed metal coordination complexes can be combined or blended in various proportions to broaden a range of properties, such as water solubility or lipophilicity, passivation rate, passivation lifetime and durability, and so forth.

The colorant systems of the inkjet ink compositions employed in accordance with one embodiment of the invention may be dye-based, pigment-based or combinations of dye and pigment. Compositions incorporating pigment are particularly useful. Pigment-based ink compositions are used because such inks render printed images having higher optical densities and better resistance to light and ozone as compared to printed images made from other types of colorants. A wide variety of organic and inorganic pigments, alone or in combination with additional pigments or dyes, can be in the present invention. Pigments that may be used in the invention include those disclosed in, for example, U.S. Pat. Nos. 5,026,427; 5,086,698; 5,141,556; 5,160,370; and 5,169,436. The exact choice of pigments will depend upon the specific application and performance requirements such as color reproduction and image stability.

Pigments suitable for use in the invention include, but are not limited to, azo pigments, monoazo pigments, di-azo pigments, azo pigment lakes, β-Naphthol pigments, Naphthol AS pigments, benzimidazolone pigments, di-azo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42. In accordance with one embodiment of the invention, colorants comprising cyan, magenta, or yellow pigments are, specifically employed.

White pigments, which may be used in ancillary white ink compositions, may be those which are capable of rendering said ink composition white. Any of several white pigments, which are commonly used in this field, may be employed. Employed as such white pigments may be, for example, white inorganic pigments, white organic pigments, and fine white hollow polymer particles. White pigments include inorganic pigments such as sulfates of alkaline earth metals such as barium sulfate, carbonates of alkaline earth metals such as calcium carbonate, silica such as fine silicic acid powder, synthetic silicates, calcium silicate, alumina, alumina hydrates, titanium oxide, zinc oxide, talc, and clay. Specifically, titanium oxide is known as a white pigment which exhibits desired covering properties, coloring (tinting) properties, and desired diameter of dispersed particles. White organic pigments include organic compound salts disclosed in JP-A No. 11-129613, and alkylenebismelamine derivatives disclosed in JP-A Nos. 11-140365 and 2001-234093. Specific commercially available products of the aforesaid white pigments are Shigenox OWP, Shigenox OWPL, Shigenox FWP, Shigenox FWG, Shigenox UL, and Shigenox U (all are commercial product names, by Hakkoru Chemical Co.). Additionally fine white hollow polymer particles such as fine thermoplastic particles comprised substantially of an organic polymer, which are disclosed in U.S. Pat. No. 4,089,800 may be employed.

Pigment-based ink compositions employing non-self-dispersed pigments that are useful in the invention may be prepared by any method known in the art of inkjet printing. Useful methods commonly involve two steps: (a) a dispersing or milling step to break up the pigments to primary particles, where primary particle is defined as the smallest identifiable subdivision in a particulate system, and (b) a dilution step in which the pigment dispersion from step (a) is diluted with the remaining ink components to give a working strength ink. The milling step (a) is carried out using any type of grinding mill such as a media mill, a ball mill, a two-roll mill, a three-roll mill, a bead mill, and air-jet mill, an attritor, or a liquid interaction chamber. In the milling step (a), pigments are optionally suspended in a medium that is typically the same as or similar to the medium used to dilute the pigment dispersion in step (b). Inert milling medium is optionally present in the milling step (a) in order to facilitate break up of the pigments to primary particles. Inert milling media include such materials as polymeric beads, glasses, ceramics, metals and plastics as described, for example, in U.S. Pat. No. 5,891,231. The milling media described in U.S. Pat. No. 5,679,138 is preferred to obtain pigment dispersion of finer particle size. Milling media are removed from either the pigment dispersion obtained in step (a) or from the ink composition obtained in step (b).

A dispersant is optionally present in the milling step (a) in order to facilitate deaggregation or comminution of the pigments into primary particles. For the pigment dispersion obtained in step (a) or the ink composition obtained in step (b), a dispersant is optionally present in order to maintain particle stability and prevent settling. Dispersants suitable for use in the invention include, but are not limited to, those commonly used in the art of inkjet printing. For aqueous pigment-based ink compositions, particularly useful dispersants include anionic surfactants such as sodium dodecylsulfate, or potassium or sodium oleylmethyltaurate as described in, for example, U.S. Pat. No. 5,679,138, U.S. Pat. No. 5,651,813 or U.S. Pat. No. 5,985,017.

Self-dispersing pigments that are dispersible without the use of a dispersant or surfactant can be used in the invention. Pigments of this type are those that have been subjected to a surface treatment such as oxidation/reduction, acid/base treatment, or functionalization through coupling chemistry. The surface treatment can render the surface of the pigment with anionic, cationic or non-ionic groups such that a separate dispersant is not necessary. The present invention is particularly useful in combination with the use of self-dispersed negatively surface charged pigments. The preparation and use of covalently functionalized self-dispersed pigments suitable for inkjet printing are reported by Bergemann, et al., in U.S. Pat. No. 6,758,891 B2 and U.S. Pat. No. 6,660,075 B2, Belmont in U.S. Pat. No. 5,554,739, Adams and Belmont in U.S.

Pat. No. 5,707,432, Johnson and Belmont in U.S. Pat. Nos. 5,803,959 and 5,922,118, Johnson et al in and U.S. Pat. No. 5,837,045, Yu et al in U.S. Pat. No. 6,494,943 B1, and in published applications WO 96/18695, WO 96/18696, WO 96/18689, WO 99/51690, WO 00/05313, and WO 01/51566, Osumi et al., in U.S. Pat. No. 6,280,513 B1 and U.S. Pat. No. 6,506,239 B1, Karl, et al., in U.S. Pat. No. 6,503,311 B1, Yeh, et al., in U.S. Pat. No. 6,852,156 B2, Ito et al., in U.S. Pat. No. 6,488,753 B1 and Momose et al., in EP 1,479,732 A1. Examples of commercially available self-dispersing type pigments include Cab-O-Jet 200®, Cab-O-Jet-250®, Cab-O-Jet-260®, Cab-O-Jet-270®, and Cab-O-Jet 300® (Cabot Specialty Chemicals, Inc.) and Bonjet CW-1® and CW-2® (Orient Chemical Industries, Ltd.).

Polymeric dispersants are also known and useful in aqueous pigment-based ink compositions. Polymeric dispersants may be added to the pigment dispersion prior to, or during the milling step (a), and include polymers such as homopolymers and copolymers; anionic, cationic or nonionic polymers; or random, block, branched or graft polymers. Polymeric dispersants useful in the milling operation include random and block copolymers having hydrophilic and hydrophobic portions; see for example, U.S. Pat. No. 4,597,794; U.S. Pat. No. 5,085,698; U.S. Pat. No. 5,519,085; U.S. Pat. Nos. 5,272,201; 5,172,133; U.S. Pat. No. 6,043,297 and WO 2004/111140A1; and graft copolymers; see for example, U.S. Pat. No. 5,231,131; U.S. Pat. No. 6,087,416; U.S. Pat. No. 5,719,204; or U.S. Pat. No. 5,714,538. Typically, these polymeric resins are copolymers made from hydrophobic and hydrophilic monomers. The copolymers are designed to act as dispersants for the pigment by virtue of the arrangement and proportions of hydrophobic and hydrophilic monomers. The pigment particles are colloidally stabilized by the dispersant and are referred to as a polymer dispersed pigment dispersion. Polymer stabilized pigment dispersions have the additional advantage of offering image durability once the inks are dried down on the ink receiver substrate.

Polymeric dispersants (copolymers) are not limited in the arrangement of the monomers comprising the copolymer. The arrangement of monomers may be totally random, or they may be arranged in blocks such as AB or ABA wherein, A is the hydrophobic monomer and B is the hydrophilic monomer. In addition, the polymer may take the form of a random terpolymer or an ABC tri-block wherein, at least one of the A, B and C blocks is chosen to be the hydrophilic monomer and the remaining blocks are hydrophobic blocks dissimilar from one another.

Especially useful copolymer dispersants are those where the hydrophobic monomer is selected from benzyl methacrylate or acrylate, or from methacrylic or acrylic acid esters containing an aliphatic chain having twelve or more carbons, which aliphatic chains may be linear or branched. Examples of methacrylic and acrylic acid esters having twelve or more carbons include; lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, decyltetradecyl methacrylate, and the like. Preferably the methacrylate or acrylate monomer is stearyl or lauryl methacrylate or acrylate. The hydrophobic portion of the polymer may be prepared from one or more of the hydrophobic monomers.

Preferred copolymer dispersants are those where the hydrophilic monomer is selected from carboxylated monomers. Preferred polymeric dispersants are copolymers prepared from at least one hydrophilic monomer that is an acrylic acid or methacrylic acid monomer, or combinations thereof. Preferably, the hydrophilic monomer is methacrylic acid. Particularly useful polymeric pigment dispersants are further described in US 2006/0012654 A1 and US 2007/0043144 A1, the disclosures of which are incorporated herein by reference.

Typically, the weight average molecular weight of the copolymer dispersant has an upper limit such that it is less than about 50,000 Daltons. Desirably the weight average molecular weight of the copolymer is less than about 25,000 Daltons; more preferably it is less than 15,000 and most preferably less than 10,000 Daltons. The copolymer dispersants preferably have a weight average molecular weight lower limit of greater than about 500 Daltons.

Encapsulating type polymeric dispersants and polymeric dispersed pigments thereof can also be used in the invention. Specific examples are described in U.S. Pat. No. 6,723,785, U.S. Pat. No. 6,852,777, US 2004/0132942 A1, 2005/0020731 A1, 2005/00951 A1, 2005/0075416 A1, 2005/0124726 A1, 2004/007749 A1, and 2005/0124728 A1, the disclosures of which are incorporated by reference. Encapsulating type polymeric dispersants can be especially useful because of their high dispersion stability on keeping and low degree of interaction with ink components. Composite colorant particles having a colorant phase and a polymer phase are also useful in aqueous pigment-based inks of the invention. Composite colorant particles are formed by polymerizing monomers in the presence of pigments; see for example, US 2003/0199614 A1; US 2003/0203988 A1; or US 2004/0127639. Microencapsulated-type pigment particles are also useful and consist of pigment particles coated with a resin film; see for example U.S. Pat. No. 6,074,467.

The pigments useful in the ink composition of the invention may be present in any effective amount, generally from 0.1 to 10% by weight, and preferably from 0.5 to 6% by weight, more preferably from 1 to 4% by weight. The pigment particles useful in the invention may have any particle sizes which can be jetted through a print head. Preferably, the pigment particles have a mean particle size of less than about 0.5 micron, more preferably less than about 0.2 micron.

Water soluble or dispersible anionically charged polymers of the type described for use as dispersants may alternatively or additionally be used in printing fluid compositions of the invention to provide improved jetting performance and improved durability. Acrylic polymers which may be employed in the present invention are exemplified by those disclosed in U.S. Pat. No. 6,866,379, which is incorporated herein in its entirety by reference. Specific examples of preferred water-soluble polymers useful in the present invention are copolymers prepared from at least one hydrophilic monomer that is an acrylic acid or methacrylic acid monomer, or combinations thereof. The water-soluble polymer may also be a styrene-acrylic copolymer comprising a mixture of vinyl or unsaturated monomers, including at least one styrenic monomer and at least one acrylic monomer, at least one of which monomers has an acid or acid-providing group. Such polymers are disclosed in, for example, U.S. Pat. Nos. 4,529,787; 4,358,573; 4,522,992; and 4,546,160; the disclosures of which are incorporated herein by reference. Additional useful anionic charged polymers that may be used in embodiments of the invention include water dispersible polyurethanes, such as those disclosed as binders in pigmented inks in U.S. Pat. No. 6,533,408, and particularly useful polyurethanes for pigmented inkjet inks which exhibit good jetting performance and good resulting image durability are described in US 2004/0085419A1, the disclosures of both are incorporated herein by reference. US Publication Numbers 2006/0100306 and 2006/0100308 disclose the use of polyurethanes and mixtures of polyurethanes and acrylic polymers having specified acid numbers for use in clear ink compositions, which also may be used in embodiments of the present invention.

In addition to or in place of dispersed pigment colorants, the aqueous inks employed in certain embodiments of the invention can contain dyes as primary or supplemental colorants. Dyes suitable for use in the invention include, but are not limited to, those commonly used in the art of inkjet printing. For aqueous-based ink compositions, such dyes include water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like. Specific examples of dyes usable in the present invention include but are not limited to: Acid Yellows, Reactive Yellows, Food Yellows, Acid Reds, Direct Reds, Reactive Reds, Food Reds, Acid Blues, Direct Blues, Reactive Blues, Food Blues, Acid Blacks, Direct Blacks, Reactive Blacks, Food Black, CAS No. 224628-70-0 sold as JPD Magenta EK-1 Liquid from Nippon Kayaku Kabushiki Kaisha; CAS No. 153204-88-7 sold as Intrajet® Magenta KRP from Crompton and Knowles Colors; and the metal azo dyes disclosed in U.S. Pat. Nos. 5,997,622 and 6,001,161. Useful dye-based colorant systems for traditional, nickel-based continuous inkjet printheads are disclosed in EP 0 781 818 B1, the disclosure of which is incorporated by reference. Also useful in the invention as supplemental colorants are polymeric dyes or loaded-dye/latex particles. Examples of polymeric dyes are described in U.S. Pat. No. 6,457,822 B1 and references therein. Examples of loaded-dye/latex particles are described in U.S. Pat. No. 6,431,700 B1; US 2004/0186199 A1; US 2004/0186198 A1; US 2004/0068029 A1; US 2003/0119984 A1; and US 2003/0119938 A1. The supplemental colorants used in the ink composition of the invention may be present in any effective amount, generally from about 1.0 to 10% by weight, and preferably from about 2.0 to 5% by weight.

A particular advantage of the invention is that relatively low concentrations of metal ligand complex is required to provide silicon etch inhibition. Accordingly, relatively low levels, such as less than 2 weight percent, or less than about 1 weight percent, or even less than 0.1 weight percent, may be employed to effectively minimize corrosion, while only minimally impacting coloration of the aqueous formulation into which they are incorporated. Effective amounts of such compounds for corrosion inhibition may typically start at about 0.0001 weight percent, although even lower concentrations may still provide some benefit. Preferred concentrations for the soluble metal ligand complex are from 0.001 to less than 1.0 weight percent (10-10,000 ppm), more preferably 0.001 to 0.1 weight percent (10-1,000 ppm).

Any water-soluble humectant known in the ink jet art and compatible with the other requirements of the invention can be employed. By water-soluble is meant that a mixture of the employed humectant(s) and water is homogeneous. While an individual humectant can be employed, useful inkjet inks can employ mixtures of two, three or more humectants, each of which imparts a useful property to the inkjet ink. Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, dipropyleneglycol, the polyethylene glycols with average molecular weights ranging from 200 to about 5000 Daltons, the polypropylene glycols with average molecular weights ranging from 200 to about 5000 Daltons, 1,2-propanediol, 1,3-propanediol, 1,2-butanediol, 1,3-butanediol, 1,4-butanediol, 1,2,4-butanetriol, 3-methyl-1,3-butanediol, 2-methyl-1,3-propanediol, 1,5-pentanediol, 1,6-hexanediol, 2-methyl-2,4-pentanediol, 1,7-heptanediol, 2-ethyl-1,3-hexane diol, 2,2,4-trimethyl-1,3-pentane diol, 1,8-octane diol, glycerol, 1,2,6-hexanetriol, 2-ethyl-2-hydroxymethyl-propanediol, 2-methyl-2-hydroxymethyl-propanediol, saccharides and sugar alcohols and thioglycol; (3) polyoxygenated polyols and their derivatives such as diglycerol, polyglycerols, glycerol ethoxides, glycerol propoxides, glyceryths, alkylated and acetylated glyceryths, pentaerythritol, pentaerythritol ethoxides, and pentaerythritol propoxides and their alkylated and acetylated derivatives; (4) nitrogen-containing compounds such as urea, 2-pyrrolidone, N-methyl-2-pyrrolidone, imidazolidinone, N-hydroxyethyl acetamide, N-hydroxyethyl-2-pyrrolidinone, 1-(hydroxyethyl)-1,3-imidazolidinone, 1,3-dimethyl-2-imidazolidinone, and 1,3-dihydroxy-2-imidazolidinone; (5) sulfur-containing compounds such as 2,2'-thiodiethanol, dimethyl sulfoxide and tetramethylene sulfone; and (6) water soluble N-oxides such as 4-methylmorpholine-N-oxides. Of these, glycerol and the polyhydric alcohol derivatives thereof are preferred and glycerol is especially preferred. The polyhydric alcohol derivatives of glycerol include the glycerol ethoxides, glycerol propoxides and glyceryths. The humectant can be employed alone or in combination with one or more additional listed humectants. The useful humectants have melting points below the typical operating temperature of the intended printer system to avoid the formation of crystalline deposits on the printhead or in the maintenance system. Practically, this means that the useful humectants have melting points below 30° C., preferably below 20° C. and more preferably below 10° C. When glycerol and the polyhydric alcohol derivatives thereof are employed, they can preferably be employed at between 1 and 20% by weight, more preferable at between 2 and 15% by weight and most preferable at between 3 and 10% by weight. While any quantity of water soluble humectants singly or in combination and dynamic surface tension reducing agents can be employed, the total quantity of water soluble humectant and dynamic surface tension reducing agents is preferably at between 3 and 30 percent by weight and more preferably at between 8 and 20 percent by weight.

In contrast to sheet-fed drop-on-demand printing, CIJ is a very high speed printing process, and it is desired to operate paper roll-fed web transport presses at substrate transport speeds in excess of 100 m/minute. Printing speed alone imposes some limitations on ink formulation relative to slower drop-on-demand printing techniques, simply on the basis of the short time requirements for adequately drying the printed substrate moving at full speed in the press before roll wind-up. Surprisingly, features of CIJ printhead operation can allow wider ink formulation latitude than is possible in DOD printing in other respects, however. Ink formulation considerations specific to traditional CIJ printing are described in W. Wnek, IEEE Trans. 1986, 1475-81, which elucidates the ink performance requirements for drop formation, deflection and catching of non-printing drops, recirculation of the ink to the printhead from the storage reservoir for future printing, and also for commercial ink-media image quality and durability.

An inkjet ink composition for use in a continuous inkjet printer desirably contains water as the principal vehicle or carrier medium, colorant, humectant, biocide, and surfactant; it can desirably further contain one or more types of other components, including and not limited to a film-forming binder or mordant, a solubilizing agent, a co-solvent, a base, an acid, a pH buffer, a wetting agent, a chelating agent, a corrosion inhibitor, a viscosity modifier, a penetrant, a wetting agent, an antifoamant, a defoamer, an antifungal agent, a jetting aid, a filament length modifier, a trace of multivalent cationic flocculating salt, a solution conductivity control agent, or a compound for suppressing electrostatic deflection charge shorts when ink dries on the charge ribbon electrodes.

The total humectant level of the inkjet ink composition for CIJ printing is desirably from 0 to about 10% by weight. The total humectant level of the ink is the sum of the individual sources of humectant ingredients, which may include humectant added directly during ink formulation, and for example humectant associated with a commercial biocide preparation as a supplemental ingredient, or with a commercial pigment dispersion preparation that may be present to prevent so-called "paint-flakes" of dried pigment cake forming around a bottle cap, as described in U.S. 2005/0075415 A1 to Harz et al. More desirably, the total humectant level is from about 1% to about 5%, in order to facilitate drying of the inkjet printing recording material in a high speed printer while simultaneously encouraging higher equilibrium moisture content in dried ink film on hardware for redispersion and clean-up by ink, or by start-up and shut-down fluids, or by a printhead storage fluid.

The pH of the aqueous ink compositions of the invention may be adjusted by the addition of organic or inorganic acids or bases. Useful inks may have a preferred pH of from about 2 to 11, depending upon the type of dye or pigment being used and depending on the charge characteristics of the other ink components employed. Anionic charge stabilized anti-abrasion polymers are employed in inks having a pH of above about 6, with preferred pH ranges of between 7 and 11 and a more preferred pH range of between 7.5 and 10. Typical inorganic acids include nitric, hydrochloric, phosphoric and sulfuric acids. Typical organic acids include methanesulfonic, acetic, formic and lactic acids. Typical inorganic bases include alkali metal hydroxides and carbonates. Typical organic bases include ammonia, triethanolamine and tetramethylethlenediamine. The ink composition pH is desirably adjusted to be from about 7 to about 9.5; more desirably, the pH ranges from about 8 to about 9. Amine bases especially desirable in the application of the invention to CIJ printing include 3-amino-1-propanol, N,N-dimethanolamine, N,N-dimethylethanolamine, N,N-diethylethanolamine, and triethanolamine.

The inks of the invention may contain surfactants added to adjust the static surface tension or dynamic surface tension of the ink to an appropriate level. The surfactants may be anionic, cationic, amphoteric or nonionic and used at, e.g., levels of 0.001 to 5% of the ink composition. Defoaming agents comprised of phosphate esters, polysiloxanes, or acetylenic diols are optionally used with the ink compositions directed at CIJ to minimize foam formation caused the fluid agitation associated with drop catching and ink recirculation.

Inkjet ink compositions may also contain non-colored particles such as inorganic particles or polymeric particles. The use of such particulate addenda has increased over the past several years, especially in inkjet ink compositions intended for photographic-quality imaging. For example, U.S. Pat. No. 5,925,178 describes the use of inorganic particles in pigment-based inks in order to improve optical density and rub resistance of the pigment particles on the image-recording element. In another example, U.S. Pat. No. 6,508,548B2 describes the use of a water-dispersible polymer in dye-based inks in order to improve light and ozone resistance of the printed images. For use of such particles to improve gloss differential, light and/or ozone resistance, waterfastness, rub resistance and various other properties of a printed image; see for example, U.S. Pat. No. 6,598,967B1. Colorless ink compositions that contain non-colored particles and no colorant may also be used. Colorless ink compositions are often used in the art as "fixers" or insolubilizing fluids that are printed under, over, or with colored ink compositions in order to reduce bleed between colors and waterfastness on plain paper; see for example, U.S. Pat. No. 5,866,638 or U.S. Pat. No. 6,450,632 B1. Colorless inks are also used to provide an overcoat to a printed image, usually in order to improve scratch resistance and waterfastness; see for example, US 2003/0009547 A1 or EP 1,022,151 A1. Colorless inks are also used to reduce gloss differential in a printed image; see for example, U.S. Pat. No. 6,604,819 B2; US 2003/0085974 A1; US 2003/0193553 A1; or US 2003/0189626 A1. In an embodiment, the present invention may be particularly useful for colorless inks comprising anionic charged polymers that may undesirably precipitate when exposed to multivalent metal ions when added as salt solutions.

The present invention also includes substantially colorless maintenance fluid compositions which are used in printing system service applications. These solutions may or may not be used for drop formation and are not intended for marking a substrate. Some examples include printhead storage fluids, line flush fluids, apparatus cleaning fluids, printhead alignment manufacturing fluids, and so forth. A printhead storage fluid can be used for wet shutdown and storage of the MEMS printhead when inactive. It can be comprised of functional ingredients such as biocides, surfactants, detergents, solvents (e.g., isopropanol), solvosurfactants (e.g., a glycol ether), a pH buffer, and metal corrosion inhibitors. A flush fluid can be used to recirculate through the printhead in a cross-flush mode in order to straighten crooked jets.

In substantially colorless compositions of certain embodiments of the invention, such substantially colorless compositions may comprise less than 2 weight percent of any colorants, more preferably less than about 1.0 weight percent of any compounds that are colorants, and most preferably less than about 0.1 weight percent of any other compounds that are colorants. Maintenance fluids may have a wider range of pH latitude than inks, because they can be free of pH-sensitive components such as pH-sensitive dispersions. These maintenance fluids may have applications in non-printing silicon MEMS technologies as well, such as cleaning or preserving a fluidic device.

The non-colored particles used in the ink compositions may be present in any effective amount, generally from 0.01 to 20% by weight, and preferably from 0.01 to 6% by weight. The exact choice of non-colored particles will depend upon the specific application and performance requirements of the printed image.

A biocide may be added to an inkjet ink composition to suppress the growth of microorganisms such as molds, fungi, etc. in aqueous inks. Preferred biocides for an ink composition are Proxel® GXL (Arch Chemicals Inc.) at a final concentration of 0.0001-0.5 wt. %, or Kordek® MLX (Rohm and Haas Co.) in the same concentration range. Additional additives, which may optionally be present in an inkjet ink composition include thickeners, drying agents, waterfastness agents, dye solubilizers, chelating agents, binders, light stabilizers, viscosifiers, buffering agents, anti-mold agents, anti-curl agents, anti-corrosion agent, stabilizers and defoamers.

The exact choice of ink components will depend upon the specific application and performance requirements of the printhead from which they are to be jetted. For current continuous ink ejection mode, acceptable viscosities are no greater than 10 cP, preferably in the range of 1.0 to 5.0 cP at 25 degrees Celsius.

For drop-on-demand thermal printheads, the components of the ink composition are preferably selected such that the ink viscosity is less than about 4.0 centipoise at 25 degrees Celsius, more preferably less than about 3.0, even more preferably less than 2.5 and most preferably less than 2.0. Ink compositions defined by these preferred embodiments are capable of achieving high firing frequencies with low variability for a large number of firing events. Particularly preferred printhead designs are disclosed in US 2006/0103691 and US 2008/0137867, the disclosures of which are incorporated by reference herein.

In one embodiment of the invention, the inkjet ink composition for use in a continuous inkjet printer is printed by a method employing a plurality of drop volumes formed from a continuous fluid stream and non-printing drops of a different volume than printing drops are diverted by a drop deflection means into a gutter for recirculation, as disclosed in U.S. Pat. No. 6,588,888 B2 to Jeanmaire et al., U.S. Pat. No. 6,554,410 B2 to Jeanmaire et al., U.S. Pat. No. 6,682,182 B1 to Jeanmaire et al., U.S. 2003/0202054 A1 to Jeanmaire et al., U.S. Pat. No. 6,793,328 B2 to D. Jeanmaire, U.S. Pat. No. 6,866,370 B2 to D. Jeanmaire, U.S. Pat. No. 6,575,566 B1 to Jeanmaire et al., and U.S. Pat. No. 6,517,197 B2 to Hawkins et al., the disclosures of which are herein incorporated in their entirety by reference. In another preferred embodiment, the inkjet ink composition is printed using an apparatus capable of controlling the direction of the formed printing and non-printing drops by asymmetric application of heat to the fluid stream that initializes drop break-up and serves to steer the resultant drop, as disclosed in U.S. Pat. No. 6,079,821 B2 to Chwalek et al, and in U.S. Pat. No. 6,505,921 B2 to Chwalek et al., the disclosures of which are herein incorporated in their entirety by reference. Useful ink agitation, heated ink supply and printhead and fluid filtration means for CIJ pigmented inkjet ink compositions are described in U.S. Pat. No. 6,817,705 B13 to Crockett et al. Printer replenishing systems for maintaining ink quality and countering the effects of ink volatile component evaporation are described in U.S. Pat. No. 5,526,026 to M. Bowers, U.S. Pat. No. 5,473,350 to Mader et al., and EP 0 597 628 A1 to Loyd et al.

Inks of the present invention may be applied to a photoglossy or plain paper receiver. The two types of receivers are distinguished from one another in that the photoglossy receiver is manufactured with a coated layer above the underlying paper support. Examples of plain papers include: Kodak bright white inkjet paper, Hewlett Packard Color inkjet paper, Xerox Extra Bright white inkjet paper, Georgia-Pacific inkjet Paper Catalog Number 999013, Staples inkjet paper International Paper Great White MultiUse 20 Paper, Xerox Premium Multipurpose Paper, Hammermill Copy plus or ForeMP paper, and Hewlett Packard Multipurpose paper. The plain papers may include papers that have been treated with multivalent salts during or after manufacture of the paper.

Inks of the present invention can be printed as digital images having photographic quality if a suitable recording medium, such as glossy inkjet paper, is used. Photoglossy receivers may be further categorized as being a swellable media (having a non-porous polymer coating) or a microporous media, although hybrid designs are also well known. The microporous media are typically comprised of a water-absorbing layer of fine particles or powders mixed with a polymeric hydrophilic binder to form a microporous structured coating. The particles or powders are typically polycrystalline inorganic materials such as boehmite alumina, porous and non-porous silicas (for example Sylojet or Ludox particles) or amorphous inorganic materials such as aluminum silicates. Microporous photoglossy media are preferred due to their relatively quick drying capabilities and improved water-fastness and smudge resistance compared to swellable media. The design of the both plain paper and photoglossy media vary widely depending on materials and paper manufacturing processes and should not be construed to limit the scope of the present invention.

EXAMPLES

The invention and its advantages can be better appreciated by the following specific embodiments.

Preparation of Aluminum Sources

AC-1 Aluminum nitrate solution. A solution of aluminum nitrate was prepared from dry solid in distilled water to yield 0.02% based on aluminum (200 ppm).

AC-2 Aluminum lactate solution. A solution of aluminum lactate was prepared from dry solid in distilled water to yield 0.01% based on aluminum (100 ppm).

AC-3 Aluminum lactate solution. 1.06 g of 85% lactic acid was dissolved in 100 g water containing 0.91 g $NaHCO_3$ to yield a clear solution with pH 5.79. A solution of 1.25 g $Al(NO_3)_3 \cdot 9H_2O$ dissolved in 5 ml water was added in small amounts alternately with 0.61 g dry $NaHCO_3$ to maintain the pH greater than 5. Distilled water was then added to a yield a clear solution of pH 5.80 and total weight of 150 g. The aluminum content was measured as 0.062% based on aluminum (620 ppm).

AC-4 Aluminum hydroxide solution. A solution of aluminum hydroxide was prepared from dry solid in distilled water to yield 0.01% based on aluminum (100 ppm). The solution contained suspended aluminum hydroxide particles.

AC-5 Aluminum benzoate solution. 1.22 g of benzoic acid was dissolved in 100 g water containing 0.84 g $NaHCO_3$ and stirred overnight to yield a clear solution of pH 5.3. A solution of 1.25 g $Al(NO_3)_3 \cdot 9H_2O$ dissolved in 5 ml water was added in small amounts alternately with 0.51 g $NaHCO_3$ to maintain the pH greater than 5. Distilled water was then added to yield a white suspension of pH 6.26 and total weight of 150 g. The theoretical Al content was 0.0594% based on aluminum (594 ppm).

AC-6 Aluminum catechol solution. 1.22 g of catechol solid was dissolved in 400 gm distilled water, adjusted to pH 7.5 with 1 M KOH, and then adjusted with additional distilled water to yield a 500 gm solution that was 22.2 mM in catechol. This solution was diluted 1:1 with a 7.41 mM aluminum nitrate solution to yield an aluminum catechol solution that was 0.01% based on aluminum (100 ppm) after the pH was readjusted to 7.5 with 1 M KOH.

AC-7 Aluminum salicylate solution. 2.44 g of aluminum salicylate solid was diluted into 247 g distilled water. The solution was 0.06% based on aluminum (600 ppm).

AI-1 Aluminum disulfocatechol solution. 3.69 g of disulfocatechol solid was dissolved in 400 g distilled water, adjusted to pH 7.5 with 1 M KOH, and then adjusted with additional distilled water to yield a 500 g solution that was 22.2 mM in disulfocatechol. This solution was diluted 1:1 with a 7.41 mM aluminum nitrate solution to yield an aluminum disulfocatechol complex solution that was 0.01% based on aluminum (100 ppm) after the pH was readjusted to 7.5 with 1 M KOH.

AI-2 Aluminum sulfosalicylate solution. 2.54 g of 5-sulfosalicyclic acid, 2-hydrate was dissolved in 100 g water. A solution of 1.25 g of $Al(NO_3)_3 \cdot 9H_2O$ dissolved in 5 ml water was added in small amounts alternately with 2.33 g $NaHCO_3$ to maintain the pH greater than 5. Distilled water was then added to yield a clear solution of pH 6.58 and total weight of 150 g. The theoretical Al content was 0.0594% based on aluminum (594 ppm).

Preparation of Inks

Inks were prepared that contained 4% self dispersed black pigment CW-3 available from Orient Chemical Corporation. The inks also contained 5% glycerol, 15% diethylene glycol, 0.3% of an acrylic polymer (67% by mass benzyl methacrylate monomer and 33% by mass methacrylic acid monomer), 0.1% of a second acrylic polymer (77% benzyl methacrylate monomer and 23% by mass methacrylic acid monomer), 0.4% triethanol amine, and 0.4% Tergitol 15-S-12 surfactant. The aluminum sources were added to yield the concentrations outlined in Table I. The final pH of all inks was uniformly adjusted to 8.4 with 1 M KOH.

TABLE I

Description of aluminum sources in inks

| Ink ID | aluminum source | ppm Al |
|---|---|---|
| C-1 | none | 0 |
| C-2 | AC-1 | 20 |
| C-3 | AC-1 | 80 |
| C-4 | AC-3 | 20 |
| C-5 | AC-4 | 20 |
| C-6 | AC-5 | 20 |
| C-7 | AC-6 | 20 |
| C-8 | AC-7 | 20 |
| I-1 | AI-1 | 20 |
| I-2 | AI-2 | 20 |

Observations of Aluminum Source Solutions

All of the above aluminum sources were examined for color and precipitates over the course of a week. Solution color and/or suspended solids were noted.

Etching of Ink Samples 30 gm of the inks described above were placed into I-HDPE bottles with a 16 mm square coupon of silicon that had 7000 nm of TEOS deposited on one side. The TEOS coating had been measured for each coupon ahead of time using ellipsometry and modeled as a transparent film on silicon. The bottles were placed into an 80° C. oven for 7 days. Ellipsometry was then performed on the same coupon samples after rinsing with distilled water. Etching was determined by calculating the difference in TEOS thickness. Since TEOS will also swell in water under these conditions, any calculated TEOS thickness increase was attributed to this swelling with no measurable etching.

Interaction with Polymer

The same aluminum source solutions were added drop wise into an acrylic polymer solution. The polymer was the same as the second polymer used in the ink formulation (77% benzyl methacrylate monomer and 23% by mass methacrylic acid monomer). 2 g of aluminum solution was added to 8 g of a 25% solution of the polymer. Precipitation of the polymer was clearly indicated in some of the samples. The results of the source observations, etching, and polymer interaction test are shown in Table II.

TABLE II

Results of the source observation, ink etching, and polymer tests

| aluminum source | ink ID | source solution | etching, nm | polymer precipitation |
|---|---|---|---|---|
| none | C-1 | clear solution | 430 | — |
| AC-1 | C-2 | clear solution | 0 | yes |
| AC-1 | C-3 | clear solution | 0 | yes |
| AC-2 | none | clear solution | — | yes |
| AC-3 | C-4 | clear solution | 0 | yes |
| AC-4 | C-5 | white particles | 57 | no |
| AC-5 | C-6 | white particles | 0 | no |
| AC-6 | C-7 | dark particles | 0 | no |
| AC-7 | C-8 | white particles | 0 | no |
| AI-1 | I-1 | clear solution | 0 | no |
| AI-2 | I-2 | clear solution | 0 | no |

As can be seen in Table II, the inventive complex with aluminum formed a stable solution without a precipitate, protected the TEOS from etching, and did not interact unfavorably by precipitating the polymer. Formation of insoluble metal ligand complexes (solid particles), and interaction with and precipitation of polymers, are undesirable as they may clog filters or fluid channels, or reduce corrosion resistance, when employed in a printing fluid.

The invention has been described in detail with particular reference to certain preferred embodiments thereof, but it will be understood that variations and modifications can be effected within the spirit and scope of the invention.

What is claimed is:

1. An aqueous inkjet printing fluid composition for use in an inkjet printer comprising a silicon-based material which contacts the aqueous printing fluid composition, comprising in a concentration sufficient to inhibit corrosion of the silicon-based material when contacted by the aqueous printing fluid composition a soluble metal ligand complex of Formula (I):

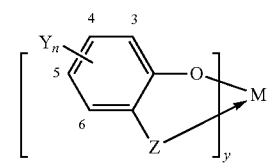

wherein M represents a divalent or a trivalent metal; Z represents OH or $CO_2H$; n represents an integer from 1-4; each Y may independently be chosen from the group consisting of halogen, cyano, carboalkoxy, alkyl, alkoxy, aryl, hetaryl, carboxy, hydroxy, sulfo and phospho, or any two of Y on adjacent carbons may be combined together to form a 5-7 carbo- or heterocyclic ring; and the number of ligands y is 2 or 3; with the proviso that at least one Y comprises a solubilizing group capable of imparting water solubility to the complex.

2. The aqueous inkjet printing fluid composition of claim 1, further comprising at least one of an anionically charged or dispersed colorant and an anionic charged polymer.

3. The aqueous inkjet printing fluid composition of claim 2, comprising an anionically dispersed pigment.

4. The aqueous inkjet printing fluid composition of claim 2, comprising a self-dispersed negatively surface charged pigment.

5. The aqueous inkjet printing fluid composition of claim 2, comprising a water soluble or dispersible anionic charged polymer.

6. The aqueous inkjet printing fluid composition of claim 2, wherein the composition comprises less than 2 weight percent of any colorants.

7. The aqueous inkjet printing fluid composition of claim 1, wherein at least one Y comprises a carboxy, sulfo or phospho group capable of imparting water solubility to the complex.

8. The aqueous inkjet printing fluid composition of claim 1, wherein at least one Y is a sulfa group.

9. The aqueous inkjet printing fluid composition of claim 1, wherein the soluble metal ligand complex is present at a concentration of less than or equal to about 1.0 weight percent.

10. The aqueous inkjet printing fluid composition of claim 1, wherein the soluble metal ligand complex is present at a concentration of from 0.0001 to less than 1.0 weight percent.

11. The aqueous inkjet printing fluid composition of claim 1, wherein M represents aluminum, gallium, indium, chromium, iron, or zinc.

12. The aqueous inkjet printing fluid composition of claim 1, wherein M represents Al(III).

13. The aqueous inkjet printing fluid composition of claim 1, wherein the soluble metal ligand complex comprises a compound of Formula (IA):

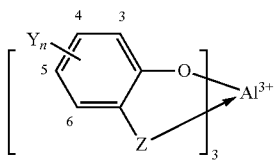

wherein at least one Y comprises a carboxy, sulfa or phospho solubilizing group capable of imparting useful water solubility to the complex.

14. The aqueous inkjet printing fluid composition of claim 13, wherein Yn comprises a 4-sulfo or 5-sulfo group substituent.

15. The aqueous inkjet printing fluid composition of claim 13, wherein Z represents OH.

16. The aqueous inkjet printing fluid composition of claim 13, wherein Z represents $CO_2H$.

17. A process for printing an inkjet printing fluid composition with an inkjet printer comprising a silicon-based material which contacts the inkjet printing fluid composition, comprising loading the printer with an aqueous inkjet printing fluid composition according to claim 1 comprising a soluble metal ligand complex in a concentration sufficient to inhibit corrosion of the silicon-based material when contacted by the aqueous ink composition, and ejecting the aqueous inkjet printing fluid composition against a recording material.

18. The process according to claim 17, wherein the inkjet printer is a drop-on-demand thermal inkjet printer which employs a silicon-based drop generating printhead.

19. The process according to claim 17, wherein the inkjet printer is a continuous inkjet printer which employs a silicon-based drop generating printhead.

20. An inkjet system comprising a) a silicon-based printhead; and b) an aqueous inkjet printing fluid composition according to claim 1 comprising a soluble metal ligand complex in a concentration sufficient to inhibit corrosion of the silicon-based printhead when contacted by the aqueous inkjet printing fluid composition.

* * * * *

UNITED STATES PATENT AND TRADEMARK OFFICE
CERTIFICATE OF CORRECTION

PATENT NO.      : 8,282,202 B2
APPLICATION NO. : 12/915527
DATED           : October 9, 2012
INVENTOR(S)     : Irving et al.

It is certified that error appears in the above-identified patent and that said Letters Patent is hereby corrected as shown below:

In Column 23, line 16 (Claim 8), delete "sulfa" and insert -- sulfo --.

In Column 24, line 1 (Claim 13), delete "sulfa" and insert -- sulfo --.

Signed and Sealed this
Fifteenth Day of January, 2013

David J. Kappos
*Director of the United States Patent and Trademark Office*